US008682516B1

(12) United States Patent
Balogh et al.

(10) Patent No.: US 8,682,516 B1
(45) Date of Patent: Mar. 25, 2014

(54) SYSTEMS AND METHODS FOR POWERING HYBRID MARINE PROPULSION SYSTEMS

(75) Inventors: Daniel J. Balogh, Menasha, WI (US); Jason S. Arbuckle, Horicon, WI (US)

(73) Assignee: Brunswick Corporation, Lake Forest, IL (US)

( * ) Notice: Subject to any disclaimer, the term of this patent is extended or adjusted under 35 U.S.C. 154(b) by 652 days.

(21) Appl. No.: 12/910,495

(22) Filed: Oct. 22, 2010

(51) Int. Cl.
*B60L 3/00* (2006.01)
*B60L 15/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ............... 701/21; 33/232; 318/588; 440/84

(58) Field of Classification Search
USPC ............... 701/21; 33/232; 318/588; 440/84
See application file for complete search history.

(56) References Cited

U.S. PATENT DOCUMENTS

| 1,332,631 | A | 3/1920 | Morse |
| 3,230,698 | A | 1/1966 | Nettles |
| 3,503,464 | A | 3/1970 | Yardney |
| 3,566,717 | A | 3/1971 | Berman et al. |
| 3,650,345 | A | 3/1972 | Yardney |
| 3,703,642 | A | 11/1972 | Balaguer |
| 3,888,325 | A | 6/1975 | Reinbeck |
| 4,233,858 | A | 11/1980 | Rowlett |
| 4,338,525 | A | 7/1982 | Kilgore |
| 5,080,064 | A | 1/1992 | Buslepp et al. |
| 5,081,365 | A | 1/1992 | Field et al. |
| 5,301,764 | A | 4/1994 | Gardner |
| 5,616,056 | A | 4/1997 | Meissner |
| 5,835,876 | A | 11/1998 | Hathaway et al. |
| 5,848,582 | A | 12/1998 | Ehlers et al. |
| 5,880,575 | A | 3/1999 | Itou et al. |
| 5,969,624 | A | 10/1999 | Sakai et al. |

(Continued)

FOREIGN PATENT DOCUMENTS

DE 101 53 586 A1 5/2002
DE 103 18 293 A1 11/2004

OTHER PUBLICATIONS

European Search Report for corresponding application EP 11 25 0074, having a completion date of May 31, 2011.

(Continued)

*Primary Examiner* — Khoi Tran
*Assistant Examiner* — Jaime Figueroa
(74) *Attorney, Agent, or Firm* — Andrus Intellectual Property Law, LLP

(57) ABSTRACT

In one example, a hybrid marine propulsion system includes a marine propulsor that propels a marine vessel; an internal combustion engine that selectively powers the marine propulsor; an electric motor that selectively powers the marine propulsor; a controller that controls operation of the internal combustion engine and the electric motor according to a plurality of modes including an engine mode wherein the engine alone powers the marine propulsor and a boost mode wherein the engine and the electric motor together power the marine propulsor; and a user input device that inputs a user-initiated command to the controller to thereby change control from the engine mode to the boost mode. Upon input of the user-initiated command, the controller can maintain an existing output of the internal combustion engine such that the power provided by the electric motor is added to the power already being provided by the internal combustion engine.

21 Claims, 4 Drawing Sheets

(56) References Cited

U.S. PATENT DOCUMENTS

| | | |
|---|---|---|
| 6,009,371 A | 12/1999 | Kobayashi |
| 6,133,707 A | 10/2000 | Kikuchi et al. |
| 6,396,161 B1 | 5/2002 | Crecelius et al. |
| 6,443,286 B1 | 9/2002 | Bratel et al. |
| 6,554,088 B2 | 4/2003 | Severinsky et al. |
| 6,587,765 B1 | 7/2003 | Graham et al. |
| 6,662,742 B2 | 12/2003 | Shelton et al. |
| 6,701,890 B1 | 3/2004 | Suhre et al. |
| 6,757,606 B1 | 6/2004 | Gonring |
| 6,758,198 B1 | 7/2004 | Suhre et al. |
| 6,800,004 B1 | 10/2004 | White et al. |
| 6,821,171 B1 | 11/2004 | Wynveen et al. |
| 6,857,918 B1 * | 2/2005 | Lebreux et al. .................. 440/6 |
| 6,882,129 B2 | 4/2005 | Boskovitch et al. |
| 6,915,781 B2 | 7/2005 | Rayl |
| 6,919,711 B2 | 7/2005 | Haydock et al. |
| 6,978,617 B2 | 12/2005 | Goldmeer et al. |
| 6,982,632 B2 | 1/2006 | Nagasaka et al. |
| 7,147,523 B2 | 12/2006 | Mori |
| 7,241,192 B2 | 7/2007 | Andersen et al. |
| 7,296,648 B2 | 11/2007 | Tatara et al. |
| 7,318,396 B1 | 1/2008 | Belter et al. |
| 7,473,149 B2 | 1/2009 | Mizokawa |
| 7,518,344 B2 | 4/2009 | Sihler |
| 7,530,864 B2 | 5/2009 | Kaji |
| 7,556,547 B2 | 7/2009 | Kaji |
| 7,565,939 B2 | 7/2009 | Ando et al. |
| 7,621,789 B2 | 11/2009 | Mizokawa |
| 7,769,504 B2 | 8/2010 | Kaji |
| 7,808,211 B2 | 10/2010 | Pacholok et al. |
| 7,862,393 B2 | 1/2011 | Levander et al. |
| 8,039,976 B2 | 10/2011 | Sato et al. |
| 8,062,081 B2 | 11/2011 | Barrett et al. |
| 8,290,682 B2 | 10/2012 | Ewert et al. |
| 8,436,583 B2 | 5/2013 | Guang et al. |
| 2004/0163861 A1 | 8/2004 | Fukuda et al. |
| 2005/0106953 A1 * | 5/2005 | Andersen et al. .................. 440/1 |
| 2006/0025025 A1 | 2/2006 | Kitani et al. |
| 2006/0040791 A1 | 2/2006 | Nakajima et al. |
| 2006/0096555 A1 | 5/2006 | Buck |
| 2006/0166573 A1 | 7/2006 | Vetta et al. |
| 2007/0062744 A1 * | 3/2007 | Weidenheimer et al. .... 180/65.2 |
| 2008/0041327 A1 | 2/2008 | Lewis et al. |
| 2008/0120516 A1 | 5/2008 | Thor |
| 2009/0156068 A1 * | 6/2009 | Barrett et al. ...................... 440/3 |
| 2009/0176417 A1 * | 7/2009 | Rembach et al. .................. 440/6 |
| 2009/0284228 A1 | 11/2009 | Kumar |
| 2009/0288896 A1 | 11/2009 | Ichikawa |
| 2009/0302616 A1 * | 12/2009 | Peterson ..................... 290/40 B |
| 2010/0105259 A1 | 4/2010 | Wejrzanowski et al. |
| 2010/0123436 A1 | 5/2010 | Herrod et al. |
| 2010/0125383 A1 * | 5/2010 | Caouette ......................... 701/21 |
| 2010/0144219 A1 | 6/2010 | Balogh et al. |
| 2010/0250041 A1 | 9/2010 | Li |
| 2011/0195618 A1 | 8/2011 | Arbuckle et al. |

OTHER PUBLICATIONS

Web Page for PowerCharge Battery Charger HV Series—Overview; http://www.powerdesignersusa.com/powercharge_hv.htm, last visited Jan. 27, 2011 (one page).

Web Page for PowerCharge Battery Charger HV Series—Specifications; http://www.powerdesignersusa.com/powercharge_hv_specs.htm, last visited Jan. 27, 2011 (two pages).

Brochure Page for PowerCharge Battery Charger HV Series and PowerCharge HV Series Product Matrix (two pages), Date: Sep. 7, 2004.

\* cited by examiner

SYSTEMS AND METHODS FOR POWERING HYBRID MARINE PROPULSION SYSTEMS

FIELD

The present disclosure is generally related to marine propulsion systems and, more particularly, to hybrid marine propulsion systems.

BACKGROUND

A typical marine vessel has one or more internal combustion engines that drive a propulsor, such as for example a propeller, impeller, pod drive, stern drive, outboard, or the like. The one or more internal combustion engines provide thrust necessary to propel the vessel.

Some marine vessels also include one or more electric motors, which are typically battery-powered motors utilized for trolling.

Abandoned U.S. patent application Ser. No. 11/505,075, the entirety of which is expressly incorporated herein by reference, discloses marine propulsion systems that connect both an internal combustion engine and an electric motor to a propulsor in torque-transmitting relation so that the propulsor can selectively receive a sum of the torque provided by the engine and the motor.

SUMMARY

The present disclosure provides parallel hybrid marine propulsion systems and methods of operating these systems in which one or more electric motors and one or more internal combustion engines are configured to alternately or simultaneously provide power to a propulsor of a marine vessel. More specifically, the present disclosure provides systems and methods for selectively powering a marine propulsion system with one or more electric motors only, one or more internal combustion engines only, and a combination of one or more motors and one or more engines.

The present disclosure further provides systems and methods for allowing an operator of a marine vessel to selectively boost power provided to such hybrid marine propulsion systems. More specifically, the present inventors have recognized that is desirable to provide marine propulsion systems with a controllable, on-demand source of boosting power. For example, certain examples disclosed herein include a user input device and controller configured to provide an operator of a marine vessel with the ability to selectively supplement power already provided to a propulsor of the vessel by an internal combustion engine with power from an electric motor. These examples can be used with systems having one or more electric motors and/or one or more internal combustion engines.

In one example, a hybrid marine propulsion system includes a marine propulsor that propels a marine vessel; an internal combustion engine that selectively powers the marine propulsor; an electric motor that selectively powers the marine propulsor; a controller that controls operation of the internal combustion engine and the electric motor according to a plurality of modes including an engine-only mode wherein the engine alone powers the marine propulsor and an electric boost mode wherein the engine and the electric motor together power the marine propulsor; and a user input device that inputs a user-initiated command to the controller to thereby change control from the engine-only mode to the electric boost mode. Upon input of the user-initiated command, the controller can maintain an existing output of the internal combustion engine such that the power provided by the electric motor is added to the power already being provided by the internal combustion engine.

In another example, a method of operating a marine propulsion system having an internal combustion engine and an electric motor that each selectively power a marine propulsor to propel a marine vessel includes operating a controller to control operation of the internal combustion engine wherein the engine alone powers the marine propulsor and then selectively inputting a command to control operation of the internal combustion engine and the electric motor such that power from the electric motor is added to the power provided by the internal combustion engine. The controller can be operated to maintain a current output of the internal combustion engine such that the power provided by the electric motor is added to the power already being provided by the internal combustion engine.

Various other examples are disclosed and claimed herein.

DETAILED DESCRIPTION

In the present description, certain terms have been used for brevity, clearness and understanding. No unnecessary limitations are to be implied therefrom beyond the requirement of the prior art because such terms are used for descriptive purposes only and are intended to be broadly construed. The systems and methods described herein may be used alone or in combination with other systems and methods. Various equivalents, alternatives and modifications are possible within the scope of the appended claims. Each element in the appended claims is intended to invoke interpretation under 35 U.S.C. §112, sixth paragraph only if the terms "means for" or "step for" are explicitly recited in the respective element.

Figure 1:
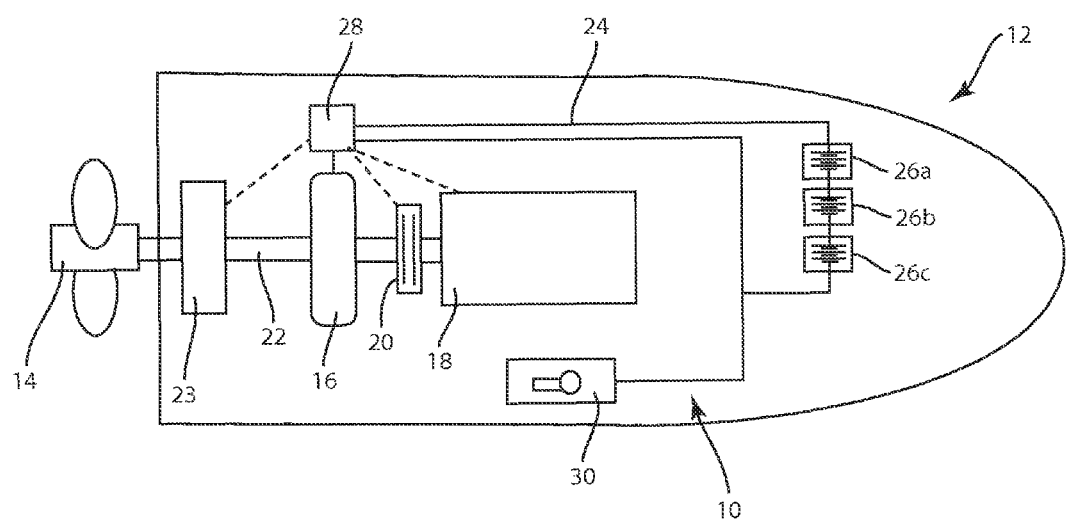
FIG. 1 is a schematic depiction of a marine vessel having a hybrid marine propulsion system.

FIG. 1 depicts a hybrid marine propulsion system 10 for a marine vessel 12. The system 10 includes among other things one or more propulsors 14 (collectively referred to herein as "propulsor"), which can include any type of device for propelling the marine vessel 12 including but not limited to one or more propellers (as shown in FIG. 1), impellers, stern drives, pod drives, and/or the like. The propulsor 14 is selectively driven by one or more electric motors 16 (collectively referred to herein as "motor"), one or more internal combustion engines 18 (collectively referred to herein as "engine"), and a combination of the electric motor 16 and engine 18. In the example shown, the system 10 also includes one or more clutches 20 (collectively referred to herein as "clutch") for selectively connecting and disconnecting the engine 18 from a driveshaft 22 that extends from the engine 18 to a transmission 23 for driving the propulsor 14. The engine 18 can include a diesel engine or any other type of engine for providing power to the propulsor 14. The clutch 20 can include any type of clutch for connecting and disconnecting the engine 18 and driveshaft 22, such as for example a friction clutch, or more preferably a dog clutch because the speeds of the motor 16 and engine 18 are typically synchronized (i.e. substantially matched) before the clutch 20 is engaged or disengaged.

The motor 16 is located between the clutch 20 and transmission 23 and is configured to drive driveshaft 22 at the same time or separately from the engine 18. In the example shown, the driveshaft 22 extends through and forms a part of the motor 16; however, arrangements where the motor 16 and driveshaft 22 are separate components are also contemplated and should be considered part of this disclosure. Together, the engine 18, clutch 20, motor 16 and transmission 23 provide forward, neutral, and reverse operations of propeller 14 in a "parallel" drive arrangement; however it should be recognized that the examples shown and described are not limiting and that the concepts discussed and claimed herein are applicable to other types of parallel and non-parallel hybrid marine propulsion configurations.

The system 10 further includes a plurality of rechargeable storage batteries 26a, 26b, 26c, which are connected in electrical communication with the motor 16 and discharge current to power the motor 16. In FIG. 1, three batteries 26a, 26b, 26c are shown connected in series with each other and to system 10; however the number of batteries 26 and the configuration thereof can vary from that shown.

In a preferred arrangement, the motor 16 is also operable as a generator to recharge the batteries 26. In this arrangement, the motor 16 is connectable in torque transmitting relation with, and driven by, the engine 18, which in turn provides a supply of current for recharging batteries 26a, 26b, 26c.

Figure 2:
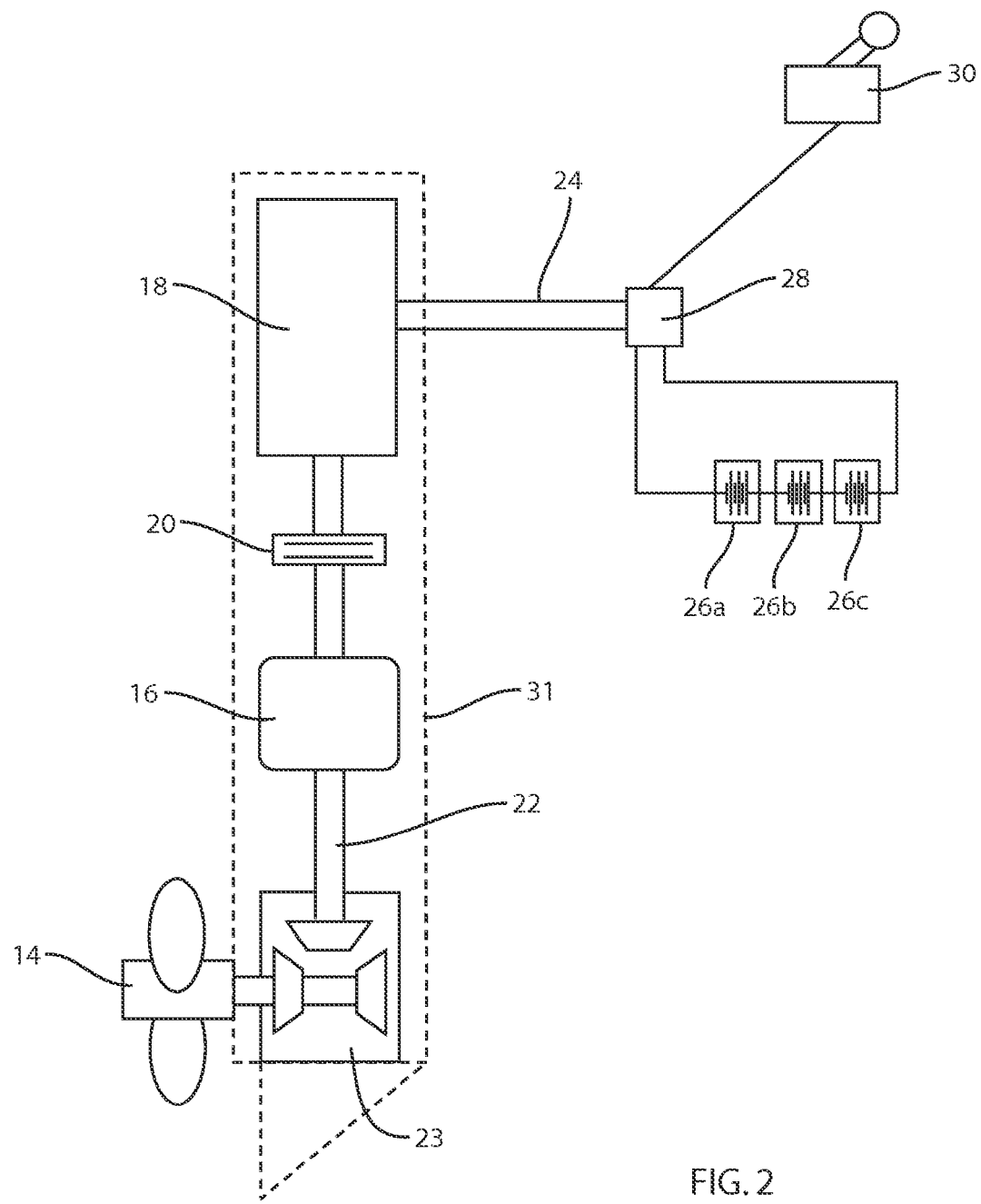
FIG. 2 is a schematic depiction of a marine vessel having a hybrid marine propulsion system configured as an outboard motor.

FIG. 1 depicts an inboard/outboard marine arrangement; however the concepts disclosed in this application are applicable to any type of marine propulsion system, such as for example an outboard motor arrangement. FIG. 2 depicts an outboard motor 31 according to such an arrangement, having reference numbers corresponding to the structures described with reference to FIG. 1.

Figure 3:
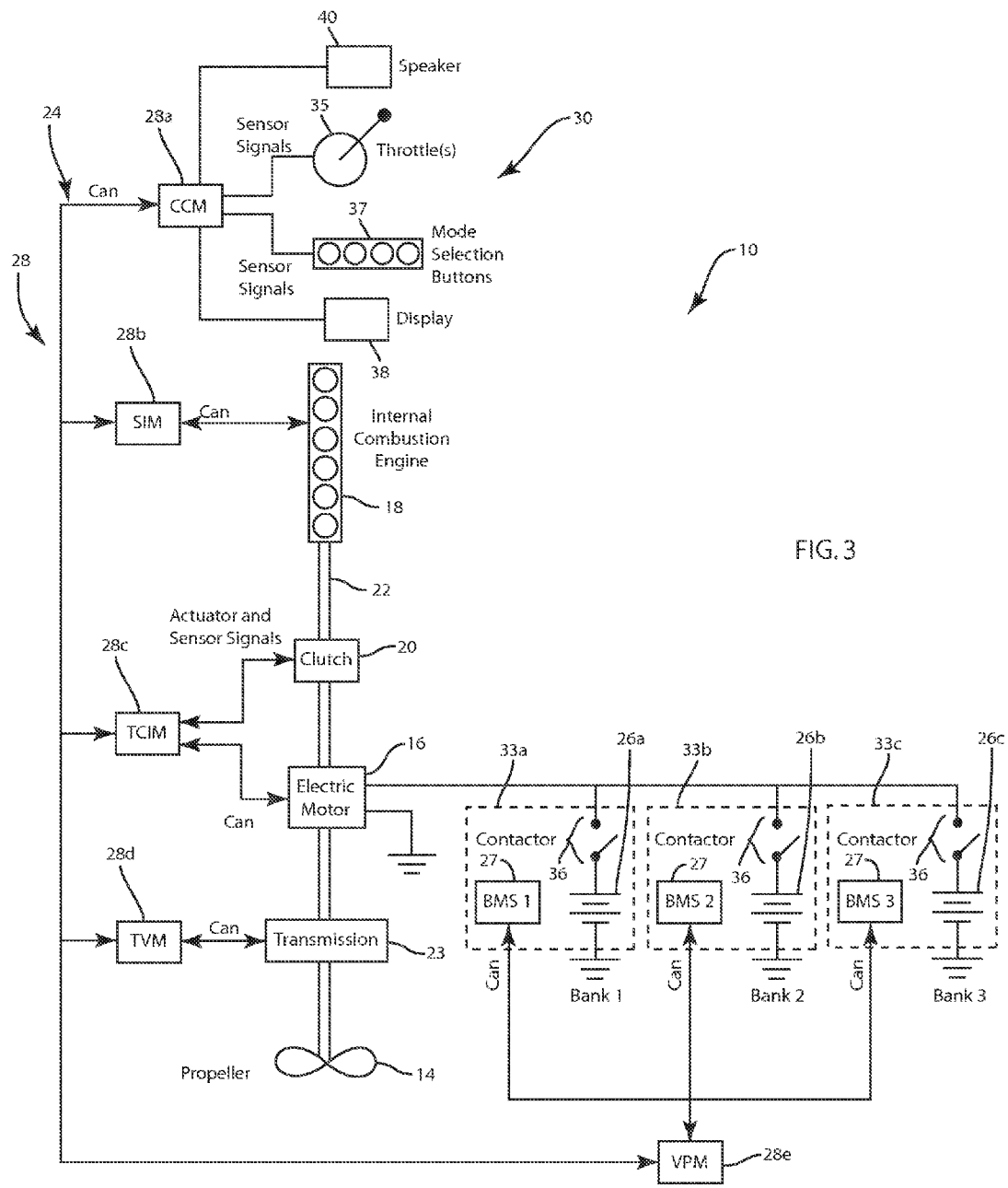
FIG. 3 is a schematic depiction of a hybrid marine propulsion system.

Referring to FIG. 3, the system 10 also includes a controller 28 connected to a controller area network 24 (CAN) for operating the system 10 in a plurality of operational modes. The controller 28 is shown schematically and includes a plurality of controller sections 28a-28e, each section having a memory and processor for sending and receiving electronic control signals, for communicating with other controllers in the controller area network 24, and for controlling operations of certain components in the system 10 such as the engine 18, clutch 20, and motor 16. The programming and operations of the controller 28 and its sections 28a-28e are described in further detail below with respect to non-limiting examples and/or algorithms. While each of these examples/algorithms includes a specific series of steps for accomplishing certain system control functions, the scope of this disclosure is not intended to be bound by the literal order or literal content of steps described herein, and non-substantial differences or changes still fall within the scope of the disclosure. Also, the configuration of the controller area network 24, controller 28, and sections 28a-28e can vary significantly. For example, the controller 28 does not need to include separately located sections and can instead comprise a single control device located at one location. Conversely the controller 28 can include more sections than those shown and sections located at different locations than those shown.

In the example shown, the controller 28 includes a command control section 28a (CCM) that is configured to receive user inputs via the controller area network 24 from a user input device 30. The user input device 30 is shown in FIGS. 1 and 2 as a conventional combination throttle/shift lever 35 and in FIG. 3 including a plurality of mode selection buttons 37; however, the user input device 30 is not limited to these configurations and can additionally or alternately comprise other devices for inputting commands to the system 10, such as fewer or more input keys than that shown, or joysticks, touch screens, and/or the like. Actuation of the user input device 30 is sensed by sensors (not shown) and communicated to command control section 28a via the controller area network 24.

The command control section 28a is programmed to convert the user inputs into electronic commands and then send the commands to other controller sections in the system 10. These other controller sections include a transmission/engine controller (SIM) 28b that controls engine/transmission/shifting and reads signals regarding transmission state and output speed; a thermal, clutch motor interface module (TCIM) 28c that controls the cooling system, clutch 20, and provides communication interface between the controller area network 24 and a controller section (not shown) for the motor 16; and a drive control module (TVM) 28d that receives commands from the command control section 28a and controls for example a pod drive to a particular steering angle. Again, the controller area network 24 shown in FIG. 3 is exemplary and could be significantly changed and still fall within the scope of the present disclosure and achieve the system functional activities set forth herein.

During operation of the marine vessel 12, the controller 28 is programmed to switch amongst at least three primary modes of control, namely (1) an Engine Mode, wherein the engine 18 is connected to the propulsor 14 by the clutch 20 and all of the driving force to the propulsor 14 is provided by the engine 18; (2) an Electric Mode, wherein the motor 16 is connected to the propulsor 14 and all of the driving force to the propulsor 14 is provided by the motor 16; and (3) a Hybrid Mode wherein both the engine 18 and the motor 16 are connected to the propulsor 14 and the driving force to the propulsor 14 is provided by a combination of the engine 18 and the motor 16. In addition, it is possible to operate a hybrid "Boost Mode" in which the engine 18 provides the primary driving force to the propulsor 14 while an additional "boost" driving force is temporarily provided by the motor 16 for temporary increased performance. This will be further discussed herein below. Also, as discussed above, when the engine 18 is providing output to the system 10, the controller 28 can operate a "Charge Mode" wherein the motor 16 is controlled to perform as a generator, thereby providing a recharge current to the batteries 26a, 26b, 26c. Charge Mode typically occurs during Hybrid Mode operation, for example, when both the motor 16 and engine 18 are connected in parallel via the driveshaft 22. Which mode of operation is utilized at any given time can depend upon the specific operating conditions of the vessel 12 or can be based upon user inputs provided by the user input device 30.

The system 10 disclosed herein is configured to provide switching between the various modes of operation while the engine 18 is running and/or while the motor 16 is running and with the propulsor 14 in neutral or in gear. For example, it is often desirable to switch into Electric Mode when operating the vessel 12 at low speeds to thereby provide quieter vessel operation and more fuel-efficient vessel operation. It is often desirable to switch into Hybrid Mode, and more specifically Charge Mode, when the power of the plurality of batteries 26a, 26b, 26c is low to thereby draw recharging current from the engine 18.

Referring to FIG. 3, each battery 26a, 26b, 26c is part of a battery bank 33a, 33b, 33c that also includes a monitor 27 (BMS) that reads signals from the individual batteries and a contactor 36 that is configured to connect and disconnect the respective battery 26a, 26b, 26c from the system 10. Each contactor 36 is configured such that if for example more than a predetermined amount of current is received by that respective battery during recharging or if the battery discharges more than a predetermined amount of current to the system 10 to power the motor 16, the contactor 36 opens and the battery is disconnected from the system 10. User intervention is typically required thereafter to reconnect the battery to the system 10. This type of battery is conventional and commercially available for example from Valence Technology Inc.

The present inventors have recognized that it would be desirable to provide hybrid marine propulsion systems and methods of operating such systems wherein an operator of the vessel has the ability to control operation of the system to provide an on-demand supply of power to the propulsor to thereby boost the speed of the vessel. Such systems and methods would be useful during different vessel operations such as for example high speed operations and would also increase enjoyment of the operator while operating the vessel.

The present inventors conceived of the unique hybrid marine propulsion system 10 including the marine propulsor 14 that propels the marine vessel 12, the internal combustion engine 18 that selectively powers the marine propulsor 14, and the electric motor 16 that selectively powers the marine propulsor 14. As described above, the controller 28 controls operation of the internal combustion engine 18 and the electric motor 16 according to the above-described plurality of modes, including the Engine Mode wherein the engine 18 alone powers the marine propulsor 14 and the Boost Mode wherein the engine 18 and the electric motor 16 together power the marine propulsor 14. The system 10 further includes the user input device 30 incorporating the conventional combination throttle/shift lever and the plurality of mode selection buttons 37. According to this example, the user input device 30 is configured to allow for input of at least one user-initiated command to the controller 24, for example via the CCM 28a, to thereby enable a change of control, including a change from the Engine Mode to the Boost Mode.

Upon input of the user-initiated command, the controller 24 is configured to maintain an existing output of the internal combustion engine 18 that was previously existing in the Engine Mode. Further, the controller 24, via for example the TOM 28c, is configured to enable the electric motor 16 to provide power to the propulsor 14 that is in addition to the power already provided by the internal combustion engine 18. Thus, the power provided by the electric motor 16 is added to the power provided by the engine 18. In effect, the input of the user-initiated command to the controller 24 thus overrides the Engine Mode and initiates the Boost Mode. The TCIM 28c initiates a change in an electric field of the electric motor 16 to thereby provide the added power to the marine propulsor 14.

In one example, upon initiation of the Boost Mode, the controller 24 is configured or calibrated to operate the electric motor 16 to provide a predetermined amount of power to the marine propulsor 14. The amount of power can be limited by the controller 24 depending upon an available discharge current of the one or more batteries 33, as described in co-pending U.S. patent application Ser. No. 12/849,549, which is incorporated herein by reference. Alternately, in another example, the amount of power can be provided regardless of a charge level remaining in the one or more batteries 33. In association with this example, the inventors combined an indicator such as a visual display 38 and/or an audible speaker 40 for indicating to the operator of the marine vessel 12 an amount of power available from the electric motor 16, and more specifically an amount of charge remaining in the one or more batteries 33. In one example, the display 38 is configured to show a first color when a first amount of charge is available to power the electric motor 16 and a second, different color when a second amount of charge is available to power the electric motor 16. For example, the color red could be displayed to indicate that less than a predetermined amount of charge is available to power the electric motor 16. The color green could be displayed to indicate that more than a predetermined amount of charge is available to power the electric motor. Other types of displays including but not limited to bar charts, LED lights, or digital representations of remaining charge or electric power are contemplated. The speaker 40 could be operated alone or in conjunction with the visual display 38. The speaker 40 could be configured to sound a first alarm when a first amount of charge is available to power the electric motor 16 and a second, different alarm when a second amount of charge is available to power the electric motor 16. Other types of audible indicators are also contemplated as would be within the ordinary skill of one in the art.

In one example, the controller 28 is configured to control operation of the electric motor 16 in Boost Mode such that different amounts of power are selectively provided by the electric motor 16 for predetermined durations. For example, upon initiation of Boost Mode, the controller 28 can be configured to operate the electric motor 16 to increase normal output power of the system 10 by fifty percent for a predetermined duration, such as three minutes. The controller 28 can further be configured to operate the electric motor 16 to double normal output power of the system 10 for thirty seconds, and/or to triple the normal output power of the system 10 for five seconds, etc. The various increases in power and respective time periods thereof can vary from these examples. The available amounts and durations of power increase can be displayed on the visual display 38 and/or the audible speaker 40. User selectivity and control of the respective available power increases can be facilitated via the user input device 30. For example, separate buttons can be provided for each of the respective power increases and durations thereof.

Figure 4:
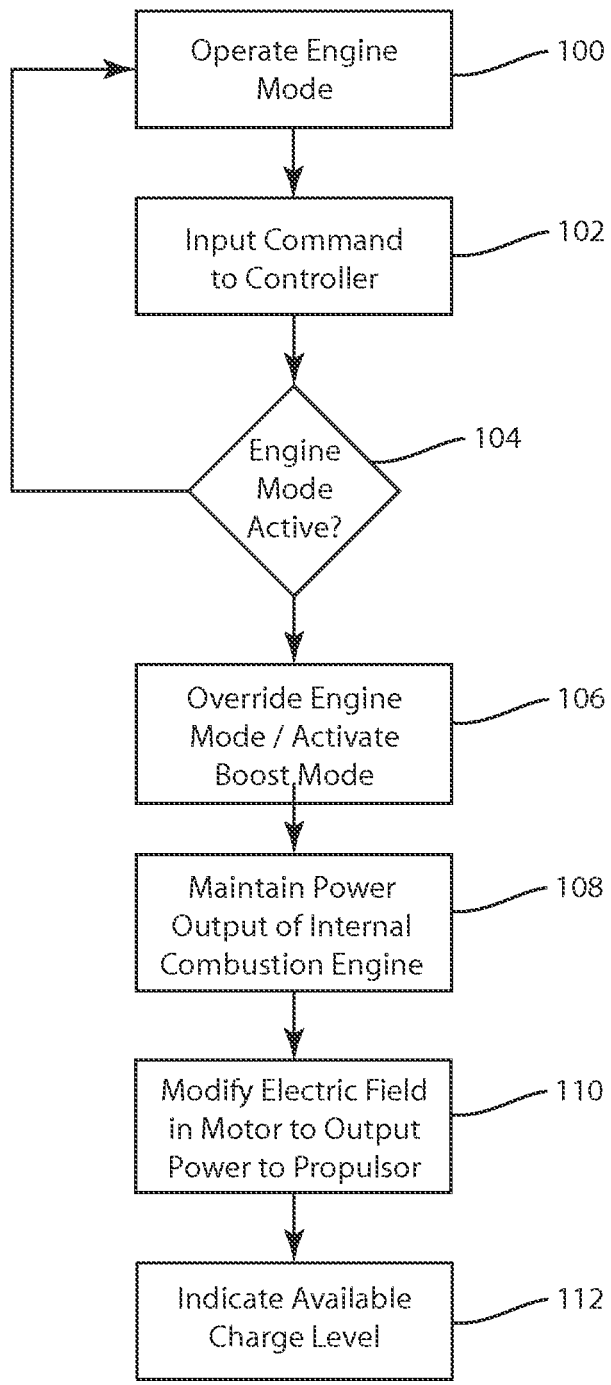
FIG. 4 is a flow chart depicting one example of a method for controlling a hybrid marine propulsion system.

FIG. 4 depicts an exemplary method of operating a marine propulsion system having an internal combustion engine and an electric motor that each selectively powers a marine propulsor to propel a marine vessel. Generally, the method shown in FIG. 4 includes the steps of (1) operating a controller to control operation of the internal combustion engine 18 wherein the engine 18 alone powers the marine propulsor 14; and (2) selectively inputting a command to control operation of the internal combustion engine 18 and the electric motor 16 such that power from the electric motor 16 is added to the power provided by the internal combustion engine 18. In one example, the controller 24 causes the electric motor to provide an amount of power based on an available discharge current of the one or more batteries, as explained hereinabove. In another example, the controller 24 causes the electric motor 16 to provide a predetermined amount of power to the marine propulsor regardless of the charge that is remaining in the one or more batteries 33.

As shown in FIG. 4, at 100, the system 10 is operated according to the Engine Mode described above. At 102, an operator of the marine vessel 12 inputs a command to the controller 28. As discussed above, this can be accomplished by pressing one or more of the mode selection buttons 37 or by an alternative input source such as a touch screen, voice input, lever, switch, and the like. At 104, the controller 28 determines whether the system 10 is currently operating under the Engine Mode. If it is determined that the Engine Mode is inactive, the controller 28 is configured to initiate operation under the Engine Mode. If the Engine Mode is active, the method continues at steps 106-112. At 106, the controller 28 is configured to override the Engine Mode and activate the Boost Mode, described above. At 108, under the Boost Mode, the controller maintains a power output of the internal combustion engine 18. At 110, the controller, via TCIM 28c, controls the electric motor 16 to modify an electric field thereof to output power to the propulsor 14. Such power is added to the power already being provided to the internal combustion 18. In some examples, the amount of added power and duration of application thereof can vary and be selected by the operator, as discussed hereinabove. At 112, the controller 28 receives, via the VPM 28e, a current charge level in the one or more batteries 33. This charge level is indicated to the operator of the vessel via, for example, the display 38, the speaker 40, or other communication mechanism.

What is claimed is:

1. A hybrid marine propulsion system comprising:
   a marine propulsor that propels a marine vessel;
   an internal combustion engine that selectively powers the marine propulsor;
   a first user input device that inputs throttle and shift commands to the controller;
   an electric motor that selectively powers the marine propulsor;
   a controller that controls operation of the internal combustion engine and the electric motor according to a plurality of modes based upon the inputs from the first input device, the plurality of modes comprising an engine mode wherein the engine alone powers the marine propulsor, an electric mode wherein the motor alone powers the marine propulsor, and a boost mode wherein the engine and the electric motor together power the marine propulsor; and
   a second user input device that inputs a user-initiated command to the controller that causes the controller to override operation in engine mode and initiate boost mode.

2. The hybrid marine propulsion system according to claim 1, wherein upon input of the user-initiated command, the controller maintains an existing output of the internal combustion engine such that the power provided by the electric motor is added to the power already being provided by the internal combustion engine.

3. The hybrid marine propulsion system according to claim 1, wherein the controller causes a change in an electric field of the electric motor to thereby provide power to the marine propulsor from the electric motor.

4. The hybrid marine propulsion system according to claim 1, wherein the second user input device comprises a push button.

5. The hybrid marine propulsion system according to claim 1, comprising at least one battery that powers the electric motor.

6. The hybrid marine propulsion system according to claim 5, wherein upon initiation of the boost mode, the electric motor provides a predetermined amount of power to the marine propulsor regardless of a charge level of the at least one battery.

7. The hybrid marine propulsion system according to claim 5, wherein upon initiation of the boost mode, the electric motor provides an amount of power to the marine propulsor based upon an available discharge current of the at least one battery.

8. The hybrid marine propulsion system according to claim 5, comprising an audio indicator that indicates to a user an amount of charge level available to power the electric motor.

9. The hybrid marine propulsion system according to claim 5, comprising a display that indicates to a user an amount of charge available to power the electric motor.

10. The hybrid marine propulsion system according to claim 5, comprising a display that indicates to a user an amount of power available from the electric motor.

11. The hybrid marine propulsion system according to claim 10, wherein the display is a visual display that shows a first color when a first amount of power is available from the electric motor and shows a second, different color when a second amount of power is available from the electric motor.

12. The hybrid marine propulsion system according to claim 1, wherein the controller is programmed to control the electric motor in the boost mode such that one of a plurality of predetermined amounts of power is provided by the electric motor for a predetermined duration.

13. A method of operating a marine propulsion system having an internal combustion engine and an electric motor that each selectively power a marine propulsor to propel a marine vessel, the method comprising:
    operating a first user input device to command a controller to control operation of the internal combustion engine according to a plurality of modes comprising an engine mode wherein the engine alone powers the marine propulsor, an electric mode wherein the motor alone powers the marine propulsor, and a boost mode wherein the engine and the electric motor together power the marine propulsor; and
    operating a second user input device to command the controller to override engine mode and control operation of the internal combustion engine and the electric motor in boost mode such that the amount of power from the electric motor is added to the power provided by the internal combustion engine.

14. The method according to claim 13, comprising operating the controller to maintain an output of the internal combustion engine such that the amount of power provided by the electric motor is added to the power already being provided by the internal combustion engine.

15. The method according to claim 13, comprising operating the controller to cause the electric motor to provide a predetermined amount of power to the marine propulsor regardless of a charge remaining in at least one battery.

16. The method according to claim 13, comprising operating a display to indicate to a user an amount of charge available to power the electric motor.

17. The method according to claim 16, comprising displaying a first color on the display when a first amount of charge is available to power the electric motor and displaying a second, different color when a second amount of charge is available to power the electric motor.

18. The method according to claim 12, comprising operating an audio device to audibly indicate to a user an amount of charge available to power the electric motor.

19. The method according to claim 13, comprising operating a display to indicate to a user an amount of power available from the electric motor.

20. The method according to claim 13, comprising controlling operation of the electric motor to provide one of a plurality of predetermined amounts of power from the electric motor to the internal combustion engine.

21. The method according to claim 20, comprising providing the one of the plurality of predetermined amounts of power for a predetermined duration.

* * * * *